United States Patent [19]
Heymann

[11] 3,826,343
[45] July 30, 1974

[54] PRESSURE REGULATOR FOR HYDRAULIC SHOCK ABSORBERS

[75] Inventor: Bernard R. Heymann, Glendale, Calif.

[73] Assignee: Conair, Inc., Glendale, Calif.

[22] Filed: Dec. 8, 1972

[21] Appl. No.: 313,590

[52] U.S. Cl. .............................. 188/282, 188/317
[51] Int. Cl............................................. F16f 9/34
[58] Field of Search .......... 188/282, 298, 317, 280, 188/320

[56] References Cited
UNITED STATES PATENTS

| | | |
|---|---|---|
| 2,352,351 | 6/1944 | Thornhill ...................... 188/317 X |
| 2,731,219 | 1/1956 | Cotton et al.................... 188/317 X |
| 2,781,869 | 2/1957 | Boehm et al.................... 188/317 X |
| 2,929,471 | 3/1960 | Schnitzer ........................... 188/298 |
| 3,469,661 | 9/1969 | Hoffmann et al............... 188/317 X |

*Primary Examiner*—George E. A. Halvosa
*Attorney, Agent, or Firm*—Lyon & Lyon

[57] ABSTRACT

A regulator for hydraulic shock absorbers wherein the moveable piston has a pressure control chamber provided with a poppet valve. A volume of air in the chamber behind the poppet valve, receives the initial impact, compressing it so that the poppet valve moves instantaneously, uncovering metering orifices in the control chamber to permit a high rate of fluid flow from the high pressure side of the piston, thereby substantially eliminating initial peak loads on the unit. As flow rate decreases, the poppet moves to gradually cover the metering orifices, maintaining a constant pressure in the high pressure side, thereby dissipating the impact at the maximum allowable rate.

3 Claims, 4 Drawing Figures

PRESSURE REGULATOR FOR HYDRAULIC SHOCK ABSORBERS

BACKGROUND OF THE INVENTION

The present invention relates generally to an improved shock absorbing device which may be utilized to particular advantage in conjunction with a bumper or the like for automotive vehicles, railroad vehicles, ships, aircraft or otherwise. The present invention has as its principal object a highly efficient shock absorber, meaning that it is capable of the greatest possible rate of energy absorption without damage to the supporting structure.

In order to dissipate the effects of an impact, it is necessary that a bumper give or move and during such movement, energy is dissipated by controlled displacement of air or fluid. Assuming that the amount of movement has a preselected maximum limit and also assuming that the structure which supports the bumper can take a maximum load without permanent damage, it follows that a bumper which continuously offers a resistance to impact substantially equal to the maximum load capability throughout its entire range of motion, regardless of the velocity of impact or the degree by which the bumper is compressed, this will provide a bumper which is 100 percent efficient. By this definition of efficiency, all known prior art shock absorbing devices are grossly inefficient.

There are three basic classes of shock absorbers using fluid as a control medium, the fully pneumatic type, the hydraulic type having a fixed orifice and those having a variable orifice. In the fully pneumatic absorbers, resistance to an imposed load increases as the bumper is compressed. Thus, at full compression all the absorber can withstand is the maximum load capability of the supporting structure and when the absorber is fully extended, its initial energy absorption capability is practically nil. Thus, such an absorber is position sensitive and its overall efficiency is usually less than 20 percent.

In a fixed orifice hydraulic device, the velocity of motion is directly proportional to the rate of fluid flow through the orifice. The resistance to flow of a fixed orifice which is a measure of energy absorption capability, is the square of the variation in flow and if impact velocity is doubled, the load transmitted to the supporting structure will be four times that of the original load. Thus, the load transferred to the supporting structure is a variable depending on the velocity of impact and therefore such an absorber is considered velocity sensitive. Since the velocity of impact is virtually unknown and since the maximum structural integrity of the support cannot be exceeded, it is essentially impossible to design such a unit having an effective degree of efficiency.

In the third category of shock absorbers having a variable orifice, the orifice size is usually reduced by means of a tapered pin or covering of some type introduced into or over the orifice as a function of absorber position. Although such a shock absorber is capable of higher efficiency than the foregoing types, it can only be such when impact velocity is known within certain limits and where it is desired for use on an automobile bumper or the like, it is again impossible to obtain a satisfactory measure of efficiency since this type of absorber is both position and velocity sensitive.

SUMMARY OF THE INVENTION

As stated, the principal object of this invention is to provide an energy absorbing device for a bumper or the like which is nearly 100 percent efficient regardless of impact velocity or bumper position. To achieve this object, I have used a means of regulating pressure within the unit so that regardless of variations in fluid flow, whether occasioned by impact velocity or degree of compression, the device will automatically maintain maximum fluid pressure on the high pressure side of the piston thereby always dissipating the maximum allowable amount of energy as the absorber compresses without ever exceeding the design limits of the supporting structure. By setting the maximum fluid pressure equal to the maximum design limits of the supporting structure, one can obtain a bumper which is nearly 100 percent efficient.

The pressure regulating device of my invention comprises essentially a control chamber positioned within the usual piston of a shock absorber. A poppet valve is positioned in the control chamber initially closing the face of the piston under static conditions and within that chamber there is a collapsible air chamber and a calibration spring normally urging the valve toward a position which closes a plurality of flow metering orifices in the sides of the control chamber. When the piston is depressed, creating a high pressure on one side, the poppet valve will not move unless the pressure exceeds the force of the calibration spring. The movement of any element inside of the absorber housing, which is substantially filled with hydraulic fluid, is limited by the attainable flow rate of the fluid through the metering orifices. In order to handle the peak load exerted a fraction of a second after initial impact, it is desirable that the piston be initially permitted to move very rapidly. The air chamber inside the pressure control chamber receives the initial impact and collapses rapidly, permitting the poppet valve to move without restriction from the hydraulic fluid which would otherwise have to move out of the way. When the air has compressed, the poppet uncovers flow metering orifices immediately permitting maximum fluid flow. As the piston continues to move and after dissipating some of the energy by the flow of fluid through the metering orifices, the initially high pressure will tend to drop, or in other words, the flow rate will tend to decrease. As high pressure drops, the poppet tends to return to its initial position gradually covering the metering orifices and thus maintains a constant pressure in the high pressure side of the piston throughout the entire range of movement of the piston. In this manner, from the point of initial impact to the point at which the piston ceases to move, the absorber continues to dissipate energy at the maximum allowable rate. As a result, the shock absorber is capable of withstanding a wide range of impact velocity, and it dissipates the energy of an impact in a shorter amount of time and with a shorter compression stroke.

Accordingly, it is a principal object of the present invention to provide an improved shock absorber capable of dissipating impact energy at a high rate of efficiency within the load carrying capabilities of the structure to which it is attached.

More specifically, it is the object of the present invention to provide an improved energy absorbing device capable of dissipating high impact loads without exceeding the design capability of supporting structure while utilizing a minimum compression stroke.

These and other objects and advantages of the present invention will readily occur to those skilled in the art upon reading the ensuing detailed description together with the accompanying drawings.

DESCRIPTION OF THE PREFERRED EMBODIMENT

Throughout the ensuing description, reference will be made to the use of an energy absorbing device in conjunction with a bumper for automobiles. This reference is merely for the purpose of explanation and clarity of understanding, it being understood that the present invention has application to other types of installations and is of particular advantage where it is desired to minimize the compression stroke of the energy absorbing device while maintaining the ability to withstand impact loads which might vary over considerable ranges in terms of force and velocity.

Figure 1:
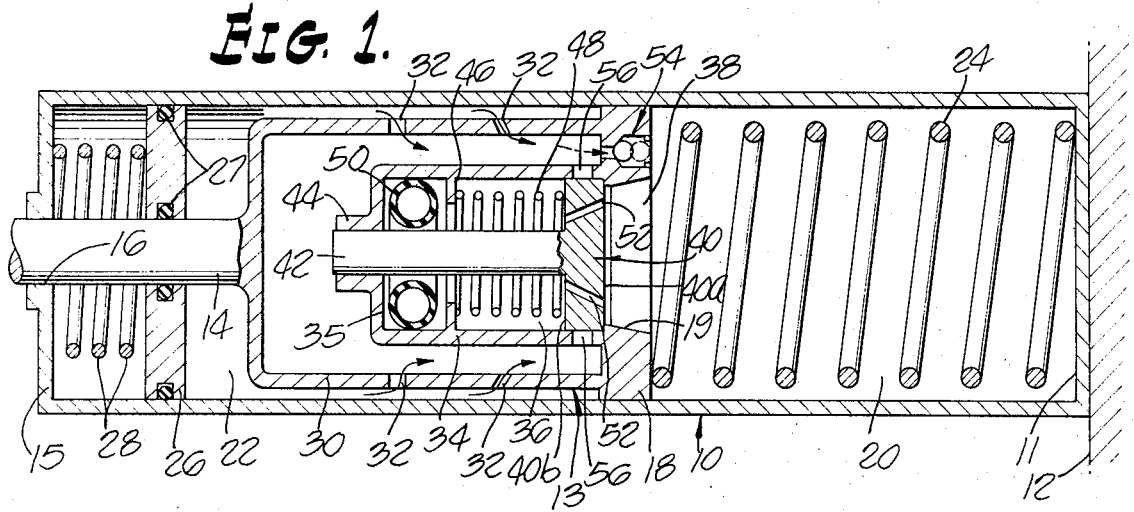
FIG. 1 is a cross-sectional view of an energy absorbing device incorporating the improvements of the present invention.

In FIG. 1, the device consists of a housing 10 of a cylindrical configuration, which may be mounted to any desired structural mount 12. Within the interior of housing 10 there is situated a piston generally designated 13 having a piston rod 14 connected thereto and extending through an aperture 16 in the end wall 15 of the housing provided with appropriate bushings. The piston rod may be connected to a bumper by which impact is imposed upon the device. Within the interior of the housing 10, piston 13 has a piston face 18 which separates the housing into what can be termed a high pressure chamber 20 and a low pressure chamber 22. The entire inside of the housing 10 with the exception of portions to be described subsequently, is filled with hydraulic fluid. A return spring 24 is situated in the high pressure chamber 20 and bears at one end against the piston face 18, and at the other end against the end wall 11 of housing 10. In operation, piston 13 will be translated to the right in FIG. 1 and in so doing displaces hydraulic fluid which is transferred from the high pressure chamber 20 to the low pressure chamber 22. For a given distance of piston travel, a volume of fluid equal to the increment of volume of additional space occupied by the piston is displaced to the left of the piston face 18, but the space on the low pressure side can accommodate less fluid because of the presence therein of the piston rod 14 and the remaining structural parts of the piston 13. Thus, a free piston 26 is positioned in the housing 10 in the low pressure chamber 22 and is provided with appropriate sealing gaskets 27 providing a sealing relationship about the inner bore and about the surface of the piston rod 14.

In addition, a spring 28 is positioned between end wall 15 of housing 10 and the free piston 26. In this manner, the free piston 26 translates to the left in FIG. 1 when the piston 12 moves to the right thereby providing additional volume for the low pressure chamber 22 to accommodate the displaced hydraulic fluid.

Piston 13 includes a piston cage 30 which couples the piston rod 14 to the piston face 18, and cage 30 is provided with a plurality of flow ports 32. Within the interior of cage 30 a housing 34 is mounted upon the rear of piston face 18 providing a pressure control chamber 36 therein. Piston face 18 is provided with a large aperture 38 which communicates control chamber 36 with high pressure chamber 20. Mounted within chamber 36 is a poppet valve 40 having a valve stem 42 connected at one end to valve 40 and having the other end extending through bushing 44 of chamber housing 34. Housing 34 is provided with an interior spring retaining boss 46. A calibration spring 48 is positioned about valve stem 42 and stationed between the spring boss 46 and the rear surface of valve head 40. Also stationed within the control chamber 36 between the spring boss 46 and the end wall 35 of housing 34 is an air chamber 50 herein shown as a toroidal member composed of an air impervious collapsible resilient material, the interior of which is filled with air. It is contemplated that other means may be utilized to provide a collapsible or compressible volume of air in communication with the fluid in the control chamber. A bellows or a moveable piston are other alternatives which readily come to mind, and for certain installations where the device is vertically oriented, a volume of air can simply be entrapped in the upper end of control chamber 36.

Valve head 40 is provided with a number of static balance orifices 52 which communicate between the high pressure chamber 20 and the interior of the control chamber 36. Thus, under static conditions, pressure is equalized on both sides of valve head 40 through orifices 52. A pressure differential is generated by the area of the valve stem 42 making the effective surface area 40b of the rear of the valve head smaller than the front surface 40a, and this differential is counteracted by the calibration spring 48, which can have a relatively small spring constant. A check valve 54 is provided in piston face 18 which permits fluid flow from the low pressure side to the high pressure chamber 20 thereby permitting piston 12 to return to the left in FIG. 1 under the force of the return spring 24 so that the unit returns to its extended position after having dissipated the energy of an impact. The control chamber housing 34 which is cylindrical in configuration is provided with a plurality of radially disposed flow metering orifices 56 located in the general vicinity of the valve seat 19 such that when valve head 40 is in its rest position against the seat 19 closing aperture 38, the valve head also completely covers orifices 56 shutting off any flow of fluid therethrough.

Figure 2:
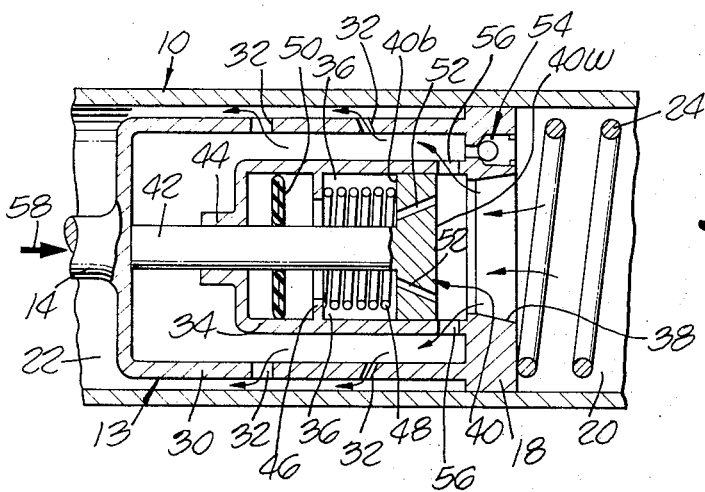
FIG. 2 is a partial cross-sectional view showing the position of the various parts thereof under conditions of a high initial impact.
Figure 3:
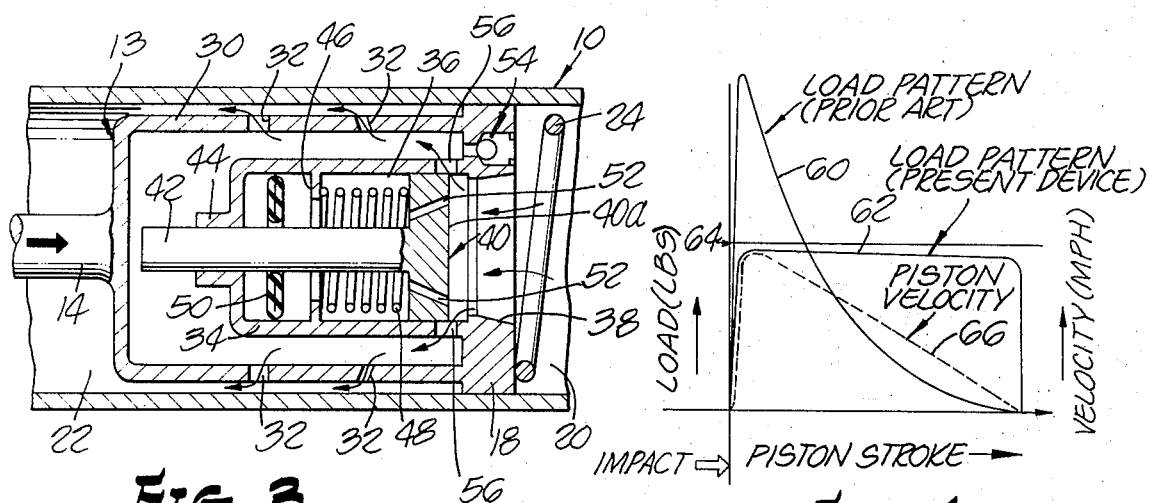
FIG. 3 is a partial cross-sectional view showing the disposition of the parts thereof at a time somewhat following initial impact.

FIGS. 2 and 3 exhibit the relative disposition of the parts of the regulator during different stages of operation thereof. In FIG. 2, the parts are shown in the position they occupy briefly after receiving an initial impact as demonstrated by the vector 58 exerted upon piston rod 14. When a sudden force 58 is imposed upon piston rod 14, piston head 18 tends to move longitudinally to the right increasing the fluid pressure in chamber 20. A pressure increase cannot simultaneously occur inside control chamber 36 because the balancing orifices 52 are too small to permit rapid flow. Thus, the calibration spring "sees" the load generated by the pressure across the entire front surface area, compressing the spring rapidly and head 40 will commence moving rapidly to the left when the pressure exceeds that which can be counteracted by the calibration spring.

As the pressure in chamber 20 further increases, the outer periphery of valve head 40 will uncover the flow metering orifices 56 allowing direct flow, as indicated by the arrows in FIG. 2, from the high pressure side 20, through orifices 56 and ports 32 into the low pressure chamber 22. In the absence of an air chamber, and under high impact velocities, the movement of poppet head 40 would be restricted by the hydraulic fluid in chamber 36 and the rate that fluid could be exhausted from the chamber, but the presence of air chamber 50 therein permits instantaneous reduction of the volume of the chamber 36 as initial impact is translated directly to the air chamber collapsing it as shown in FIG. 2. In this manner, the valve head 40 responds quickly to sudden impact as if the static balance orifices 52 were not there, uncovering the metering orifices 56 to instantaneously permit fluid flow at the maximum allowable rate as determined by the size and number of orifices 56. It has been found that the provision of air chamber 50 increases the response time of valve 40 by a factor of about 100 as opposed to the same device without such an air volume.

After the air chamber has collapsed, it no longer affects the function of the pressure regulator as will be seen from FIG. 3. After the initial impact, piston 13 continues to advance to the right, but the pressure in chamber 20 will tend to drop, or in other words, the rate of fluid flow will decrease as the result of energy dissipation. As the pressure on head 40 decreases, the calibration spring 48 will tend to move head 40 back to the right gradually covering orifices 56, steadily decreasing fluid flow from the high pressure chamber. The poppet valve 40 thus automatically positions itself over the flow metering orifices to maintain a constant high pressure in chamber 20 under the particular prevailing flow conditions. The position of the poppet valve thus changes from a condition in which the orifices 56 are fully uncovered under extremely high flow conditions, to a condition in which the orifices are almost covered under very low flow conditions. Thus, there is a force feedback provided through the mechanism of the calibration spring 48 exerted upon the high pressure chamber 20 through the poppet valve 40 whereby the system is made entirely pressure responsive and independent of impact velocity or relative piston position as the result of the automatic positioning of the poppet valve. During the return stroke, under the influence of spring 24, fluid returns to chamber 20 through check valve 54 and equalization of pressure on both sides of head 40 occurs through orifices 52 with the added influence of spring 48.

Figure 4:
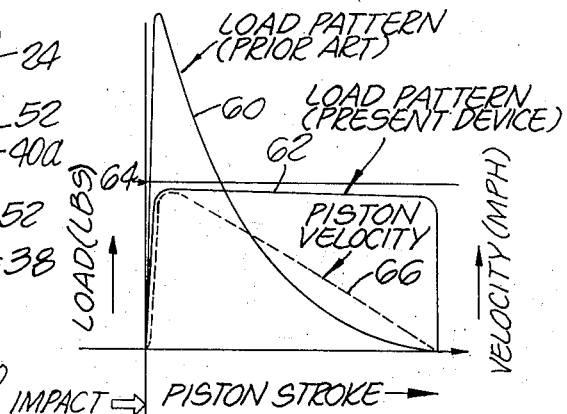
FIG. 4 is a graphical representation of typical load patterns with and without the improvement of the present invention as well as a representation of piston velocity as a function of stroke for a given impact.

FIG. 4 presents a diagram representing the performance characteristics of the present invention as compared to a prior art device. With regard to the load pattern of the device, the ordinate of the diagram represents the load in pounds and the abscissa represents piston stroke. Curve 60 represents the shape of a typical response or load pattern for an absorber which does not use the features of the present invention but which is of the fixed orifice type. Here it will be seen that from the point of impact occurring at the zero point of the coordinates, a shock absorber first experiences a high peak load as a result of the fact that the piston and hydraulic fluid are incapable of reacting fast enough. After the hydraulic fluid commences to flow, this peak load will taper off rather uniformly until all of the energy is dissipated and the piston stroke reaches the end of its travel. This curve is shown only to illustrate the general shape of the response curve and does not represent the magnitude. Such devices are dependent upon the velocity of impact and without that quantity being known, the magnitude of the peak load cannot be calculated. A peak load nevertheless does occur and that is what frequently damages these devices and/or the structures to which they are attached. On the other hand, curve 62 represents the load pattern of the present invention. Assuming a level 64 on the ordinate representing the maximum allowable design load of the supporting structure, it will be noted that curve 62 increases rapidly, approaching level 64 as a limit but then the pressure regulating system maintains the load substantially constant throughout the entire piston stroke until such time as all of the load is dissipated and piston movement stops. It will be noted that the relatively flat portion of curve 62 slopes downwardly somewhat from level 64 as a result of the fact that the return force of the calibration spring is not truly a constant, but slightly greater when fully compressed than when fully extended. Thus, this characteristic of the calibration spring obviously decreases the efficiency of the shock absorber somewhat, but by using a spring having a spring constant which is relatively uniform over the range of its displacement, this loss in efficiency may be minimized.

If the quantity indicated by the ordinate be considered the velocity of the piston, curve 66 represents the piston velocity from the point of impact until the end of its stroke. It will thus be seen that in the device of the present invention, piston velocity reaches its maximum in a very short time after the time of impact and then decreases in substantially a straight line fashion to zero. Examining the curve 60, it will immediately be noted that the peak load will greatly exceed the design capability of the supporting structure because of the inability of prior art shock absorbers to handle peak loads. As a result, shock absorbers used in situations wherein such peak loads are anticipated must ordinarily be designed so that the peak load will not exceed the load capability of the structure, with the result that a much greater piston stroke is necessary to dissipate all of the energy and the resulting absorber is extremely inefficient. Although not shown in FIG. 4, it is known that the load pattern of pneumatic shock absorbers increases gradually from the point of impact reaching a maximum as piston stroke approaches the end of its limit. The area under the load pattern curve, whether considering the curve of the present invention or of those of prior art, is a measure of the impact absorbing capability of the device. Obviously, a load pattern more closely resembling curve 62 presents the most efficient performance.

While a particular embodiment of the present invention has been shown and described in detail herein, it will be obvious to those persons skilled in the art that changes and modifications might be made without departing from this invention in its basic concepts and it is the intention to incorporate herein all such changes, modifications and elements which are equivalent in

I claim:

1. An improved hydraulic shock absorber adapted to contain a quantity of hydraulic fluid therein, comprising:

a longitudinal cylinder having sealed end walls, a piston slidably mounted in said cylinder, said piston having a piston face defining upon opposite sides thereof a high pressure chamber and a low pressure chamber, each of said chambers adapted to contain said hydraulic fluid, said piston face having an aperture therein communicating between said chambers;

a pressure control chamber mounted upon said piston in said low pressure chamber, said control chamber having a closed end, an open end and a cylindrical side wall, said open end being coupled to said piston adjacent the aperture therein and defining a valve seat, a plurality of outlet apertures formed in said side wall, valve means situated in said control chamber, said valve means comprising a poppet head slidably moveable with respect to said valve seat, a valve stem connected to said poppet head and extending through the closed end of said chamber, spring means mounted in said chamber and bearing upon said valve means for biasing said poppet head toward said valve seat, and a collapsible air chamber separate from said spring means situated in freely floating relationship within said control chamber.

2. The combination set forth in claim 1 wherein said outlet apertures in the side wall of said control chamber are positioned adjacent said valve seat, said poppet head being positioned in sliding relationship to said outlet apertures for differentially controlling the effective opening thereof.

3. The combination set forth in claim 2 further including one or more metering orifices extending through said poppet head.

* * * * *